United States Patent
Ibrahim et al.

(10) Patent No.: US 7,331,873 B2
(45) Date of Patent: Feb. 19, 2008

(54) OVER-TORQUE BREAK AWAY ROTATIONAL COUPLING AND A METHOD OF ASSEMBLING SAME

(75) Inventors: Daniel R. Ibrahim, Bloomington, IL (US); Alan R. Stockner, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 467 days.

(21) Appl. No.: 10/887,283

(22) Filed: Jul. 8, 2004

(65) Prior Publication Data

US 2006/0009294 A1    Jan. 12, 2006

(51) Int. Cl.
*F16D 7/02* (2006.01)

(52) U.S. Cl. ...................................................... 464/45

(58) Field of Classification Search .................. 464/42, 464/45, 43, 44; 417/223, 319; 474/70, 903; 192/56.6

See application file for complete search history.

(56) References Cited

U.S. PATENT DOCUMENTS 2,236,854 A * 4/1941 Ocenasek ................. 464/43 X
3,157,978 A * 11/1964 McMullen ................ 464/45 X
4,721,009 A * 1/1988 Berle et al. .............. 464/45 X

* cited by examiner

*Primary Examiner*—Greg Binda
(74) *Attorney, Agent, or Firm*—Liell & McNeil

(57) ABSTRACT

In order to prevent damage to a drive component, fail safe devices are often used to break a rotational coupling between an apparatus, such as a pump, and the drive component, such as a crank shaft of an engine, in the event of the apparatus seizing. In order to break the coupling between a drive component and an apparatus, the rotational coupling includes a coupler that is operable to rotate in a first direction attached to a shaft via a threaded fastener. A predetermined break away torque is set by tightening the threaded fastener in a direction opposite than the first direction with a predetermined tightening torque. A torque transmission interface includes opposing surfaces of the coupler and the shaft that remain fixed relative to one another below a predetermined break away torque and move relative to one another above the predetermined break away torque.

15 Claims, 3 Drawing Sheets

OVER-TORQUE BREAK AWAY ROTATIONAL COUPLING AND A METHOD OF ASSEMBLING SAME

TECHNICAL FIELD

The present invention relates generally to rotational couplings, and more specifically to an over-torque break away rotational coupling used to couple a pump to an internal combustion engine.

BACKGROUND

It is known in the art to power an apparatus by coupling the apparatus to a drive component of a machine via a rotational coupling. For instance, a pump, such as fuel or oil pump, can be coupled to a rotating crank shaft of an engine via a rotational coupling. Often, a drive gear is coupled to rotate with the crank shaft of the engine. The rotational coupling can include a gear that is meshed to rotate with the drive gear directly or via intervening idler gears. The torque from the rotating gear of the rotational coupling can be transferred to a pump shaft through a variety of ways known in the art. Thus, when the gear rotates, opposing surfaces of the gear and the pump shaft cause the torque from the rotating gear to rotate the shaft. However, if the pump seizes for any reason, such as a bearing failure, the pump's resistance to rotation will be transferred to the gear via the opposing surfaces. The resistance can be transferred back to the crank shaft, and possibly damage the engine.

It is known in the art that breaking the coupling between the engine and the pump in the event of pump seizure can reduce the likelihood of engine damage. There are various known methods of breaking the coupling. For instance, a shear pin can be used to attach the pump shaft to the gear. The force created by the pump shaft seizing while the gear continues to be rotated will break the shear pin, and thus, disengage the coupling between the shaft and the gear. Another method known in the art for breaking the coupling in the event of pump seizure includes a threaded hub shrink fitted onto a stud of the pump shaft. The gear is attached to the threaded hub via an internal threaded portion of the gear. The gear is torqued onto the threaded hub in an opposite direction to the gear's drive rotation. If the drive torque is greater than the gear assembly torque, such as when the pump seizes, the gear becomes loose on the threads and drives itself towards the pump housing and out of mesh with the drive gear.

Although both the shear pin and the threaded hub can break the coupling between the pump shaft and the gear when the pump seizes, there is room for improvement. Engineers have found reliability issues with the shear pins. For instance, during normal operation of the rotational coupling, the shear pin is subjected to wear that can lead to premature failure of the shear pin, and thus, de-coupling of the pump shaft from the gear when there has been no pump seizure. In addition, the manufacturing costs of the threaded hub are unacceptably high. Moreover, with the threaded hub design, when the coupling is broken in an over-torque situation, the gear becomes out of mesh with the drive gear. The misalignment of the gears can cause the edges of the gears to run past one another, resulting in damage to the gears. Further, if the gear of the rotational coupling is an intermediate gear between the crank shaft and another gear driven apparatus, the operation of the other gear driving apparatus could also seize due to the pump seizure.

The present invention is directed at overcoming one of more of the problems set forth above.

SUMMARY OF THE INVENTION

In one aspect of the present invention, an over-torque break away rotational coupling includes a coupler that is operable to rotate in a first direction, and a threaded fastener that includes a tightening direction opposite to the first direction. The threaded fastener attaches the coupler to a shaft via a threaded portion of the shaft. A torque transmission interface includes opposing surfaces of the coupler and the shaft. The opposing surfaces remain fixed relative to one another below a predetermined torque, and move relative to one another above the predetermined torque.

In another aspect of the present invention, a machine includes an apparatus that is coupled to a driving component via an over-torque break away rotational coupling. The over-torque break away rotational coupling includes a coupler that is operable to rotate in a first direction, and a threaded fastener that includes a tightening direction opposite to the first direction. The threaded fastener attaches the coupler to a shaft via a threaded portion of the shaft. A torque transmission interface includes opposing surfaces of the coupler and the shaft. The opposing surfaces remain fixed relative to one another below a predetermined torque, and move relative to one another above the predetermined torque.

In yet another aspect of the present invention, an over-torque break away rotational coupling is assembled by coupling a coupler to a shaft, at least in part, by threading a threaded fastener to a threaded portion of the shaft. A break away torque is set, at least in part, by tightening the threaded fastener in a direction opposite to a driving direction of the coupler with a predetermined tightening torque.

DETAILED DESCRIPTION

Figure 1:
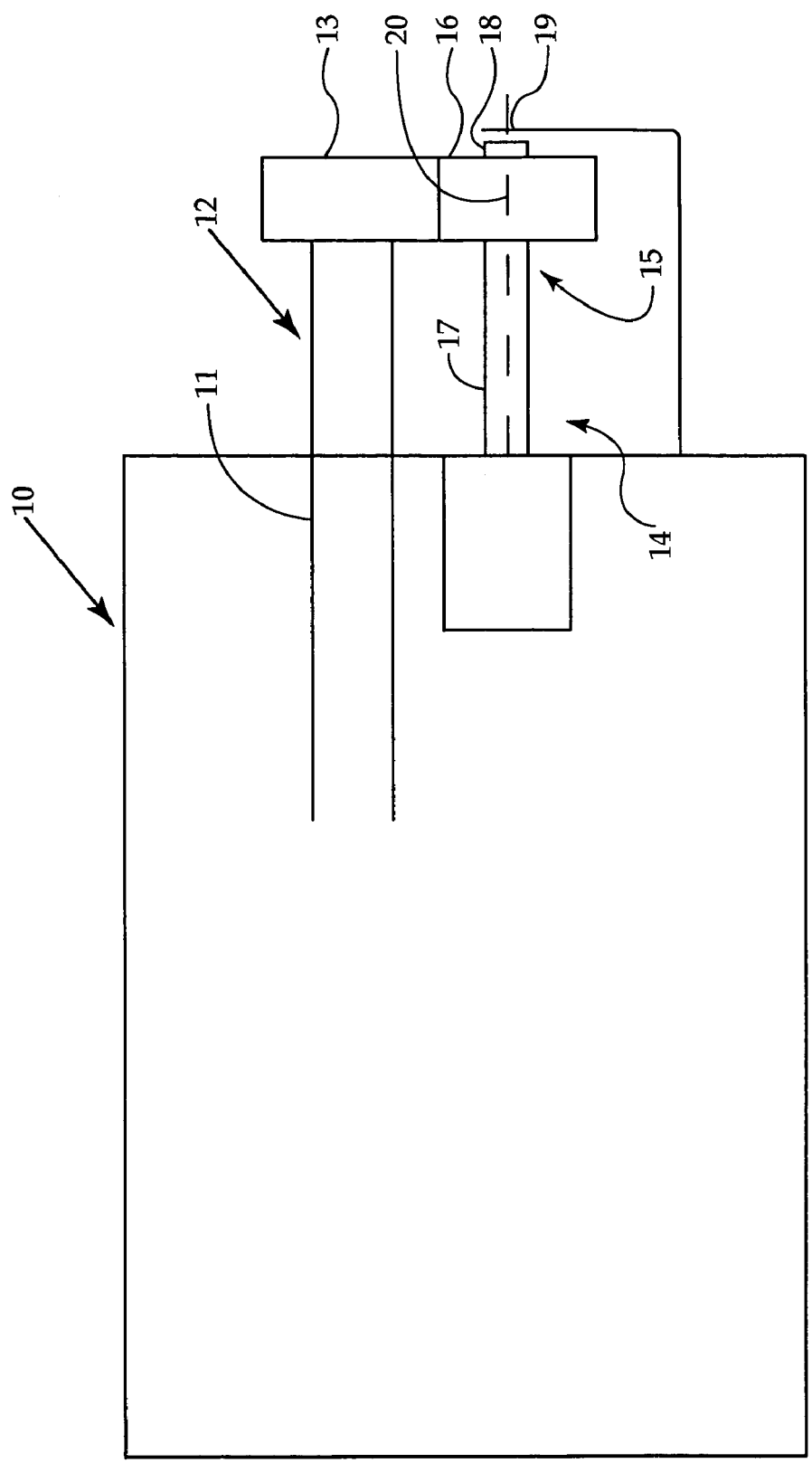
FIG. 1 is a schematic representation of an engine, according to the present invention.

Referring to FIG. 1, there is shown a schematic representation of an engine 10 according to the present invention. The engine 10 includes a drive component 12 that includes a gear 13 coupled to rotate with a rotating crank shaft 11. Those skilled in the art will appreciate that the crank shaft 11 is coupled, in a conventional manner, to rotate with the movement of pistons within the engine 10. A pump 14 is coupled to the drive component 12 via a rotational coupling 15 that includes a coupler 16 attached to a pump shaft 17. The coupler 16 is preferably a gear that is meshed to rotate with the gear 13 of the drive component 12, such that their respective rotational axes are parallel to each other but spaced apart, as shown in FIG. 1. Thus, the mechanical energy of the operating engine 10 can be transferred to rotate the pump shaft 17 via the drive component 12 and the rotational coupling 15.

Although the present invention is illustrated as a pump 14 driven by the crank shaft 11 of the engine 10, the present invention can be used with various machines that include various apparatuses driven by driving components. For instance, the present invention contemplates use in a machine tool that includes an electric motor that drives a tool. Further, although the present invention illustrates the drive component 12 being coupled to the rotational coupling 15 via the gears 13 and 16, it should be appreciated that additional gears can be positioned between and/or meshed with gears 13 and 16. Moreover, additional gears can be meshed with a side of gear 16 opposite of gear 13 in order to form a gear drive train in which gear 16 is an intermediate or idler gear. In addition, those skilled in the art should appreciate that the rotational coupling 15 can be coupled to the drive component 12 by components other than gears, including but not limited to, pulleys.

The gear 16 is attached to the pump shaft 17 via a threaded fastener 18. The gear 16 is operable to rotate in a first direction, and the threaded fastener 18 has a tightening direction opposite of the first direction. Thus, the threaded fastener 18 attaching the gear 16 to the pump shaft 17 is tightened in the opposite direction of the driving direction of the gear 16. Therefore, the attachment between the gear 16 and the pump shaft 17 is not further tightened by the driving rotation of the gear 16 during normal operation of the rotational coupling 15. Rather, the attachment could be loosened during operation if a driving torque acting on the attachment is great enough. The rotational coupling 15 also includes a fastener backstop 19 that is positioned on an opposite side of the threaded fastener 18 than the gear 16 along an axis 20 of the shaft 17. Although the fastener backstop 19 is illustrated as attached to a portion of an engine housing, it should be appreciated that the fastener backstop 19 can be any type of surface trapping the threaded fastener 18 between the gear 16 and the backstop 19 while the threads are loose but still engaged. For instance, the present invention contemplates the fastener backstop being a bracket attached to a stationary portion of the pump 14 or a jam nut positioned on the opposite side of the threaded fastener 18 than the gear 16. The jam nut could be securely threaded onto a portion of the shaft that extends through the gear and the threaded fastener.

Figure 2:
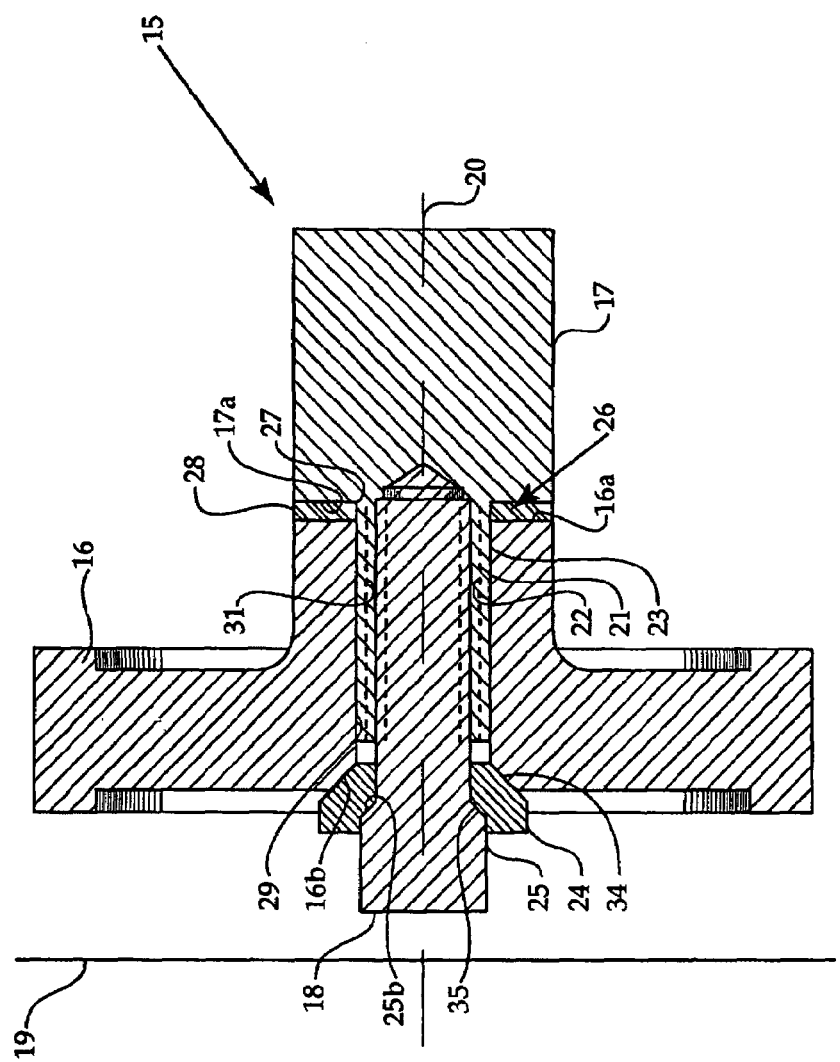
FIG. 2 is a sectioned side sectioned diagrammatic representation of a rotational coupling for the engine of FIG. 1, according to one embodiment of the present invention.

Referring to FIG. 2, there is shown a sectioned side diagrammatic representation of the rotational coupling 15 of FIG. 1, according to an embodiment of the present invention. The shaft 17 includes a threaded portion 23, preferably a threaded stud 23 that includes internal threads 31. The threaded stud 23 is received within a stud bore 29 defined by the gear 16. The threaded stud 23 defines a bore 22 in which a bolt 21 of the threaded fastener 18 is received. Threads of the bolt 21 are mated to the internal threads 31 of the threaded stud 23. The threaded stud 23 of the pump shaft 17 and the gear 16 are preferably concentric, meaning that they share the same center and common axis of rotation 20. Thus, as the gear 16 rotates, contact between an outer surface of the threaded stud 23 and an inner surface of the gear 16 defining the stud bore 29 can aid in maintaining the alignment of the pump shaft 14 and the gear 16. The threaded fastener 18 also preferably includes a collar 24 that includes an inner frustoconical surface 34 and an outer frustoconical surface 35. The collar 24 is positioned between the bolt 21 and the gear 16 such that the inner frustoconical surface 34 of the collar 24 bears against a frustoconical surface 16b of the gear 16 and the outer frustoconical surface 35 bears against a frustoconical surface 25b of a head 25 of the bolt 21. The frustoconical surfaces 34 and 35 are preferably machined to include a specific texture, preferably a relatively rough texture that has a relatively high resistance to slippage. Although the frustoconical surfaces 16b and 25b could be machined to include the desired texture rather than including the collar 24, the inclusion of the collar 24 is preferred because it has proven to be less expensive than machining the surfaces 16b and 25b, and can aid in the gripping between the gear 16 and the bolt head 25 during rotation.

The rotational coupling 15 includes a torque transmission interface 26 that includes opposing surfaces of the gear 16 and the shaft 17. Torques from gear 16 are transmitted to shaft 17 via the torque transmission interface 26. The opposing surfaces are preferably a second bearing surface 17a on a shoulder 27 of the shaft 17 and a first bearing surface 16a of the gear 16. The bearing surfaces 17a and 16a are preferably orientated perpendicular to the axis 20 of the shaft 17. The torque transmission interface 26 preferably, but not necessarily, includes a bearing plate 28 positioned between the bearing surfaces 16a and 17a. The bearing plate 28 defines a bore through which the threaded stud 23 is received. Although the bearing plate 28 is not necessary, the bearing plate 28 is preferred because the surfaces of the bearing plate 28 can be machined out of a desired material to have a desired texture without undue expense. In other words, the coefficient of static friction can be tightly controlled at a relatively low cost using a bearing plate 28 that is a separate component from gear 16 and shaft 17. Nevertheless, bearing plate 28 could be omitted without departing from the intended scope of the present invention. The surfaces of the bearing plate 28 preferably include a relatively smooth texture that has a relatively low resistance to slipping. The first bearing surface 17a and the second bearing surface 16a remain fixed relative to one another below a predetermined torque, and move relatively to one another above the predetermined torque. The predetermined torque can be considered a predetermined break away torque that is the torque sufficient to move the bearing surfaces 16a and 17a relative to one another. The movement of the first bearing surface 16a relative to the second bearing surface 17a can cause the bolt 21 to loosen from the shaft 17.

The predetermined break away torque is preferably a torque amount greater than a maximum torque exerted on the torque transmission interface 26 during normal operation of the rotational coupling 15, but less than a possible damaging torque that can be transferred to and damage the engine via the gear 16 and the drive component 12. In other words, a maximum torque that pump 14 could expect to experience during any conceived operation of engine 10. Both the maximum normal operation torque and the possible damaging torque can be determined by experimentation and methods known in the art. The predetermined break away torque is set to lie between the maximum torque and damaging torque, and is preferably a function of a predetermined threaded fastener tightening torque. The predetermined tightening torque is the torque applied to the bolt 21 in order to tighten the bolt 21 received within the bore 22. The predetermined tightening torque creates a clamping force acting on the torque transmission interface 26. The clamping force is perpendicular to the torque transmission interface 26. The clamping force required to maintain the bearing surfaces 16a and 17a fixed relative to one another below the predetermined break away torque. Those skilled in the art will recognize that the break away torque is a function of the coefficient(s) of friction between the bearing plate 28 and the bearing surfaces 16a and 17a, as well as the clamping force magnitude and the effective surface areas. Although the present invention contemplates the second bearing surface 17a of the pump shaft 17 and the first bearing surface 16a of the gear 16 being in contact with one another, the bearing plate 28 positioned between the two opposing surfaces 17a and 16a is preferred. Because the bearing plate 28 can be machined or manufactured to include surfaces with specific coefficients of friction, engineers can accurately predict the threaded fastener tightening torque needed to result in the predetermined break away torque.

Figure 3:
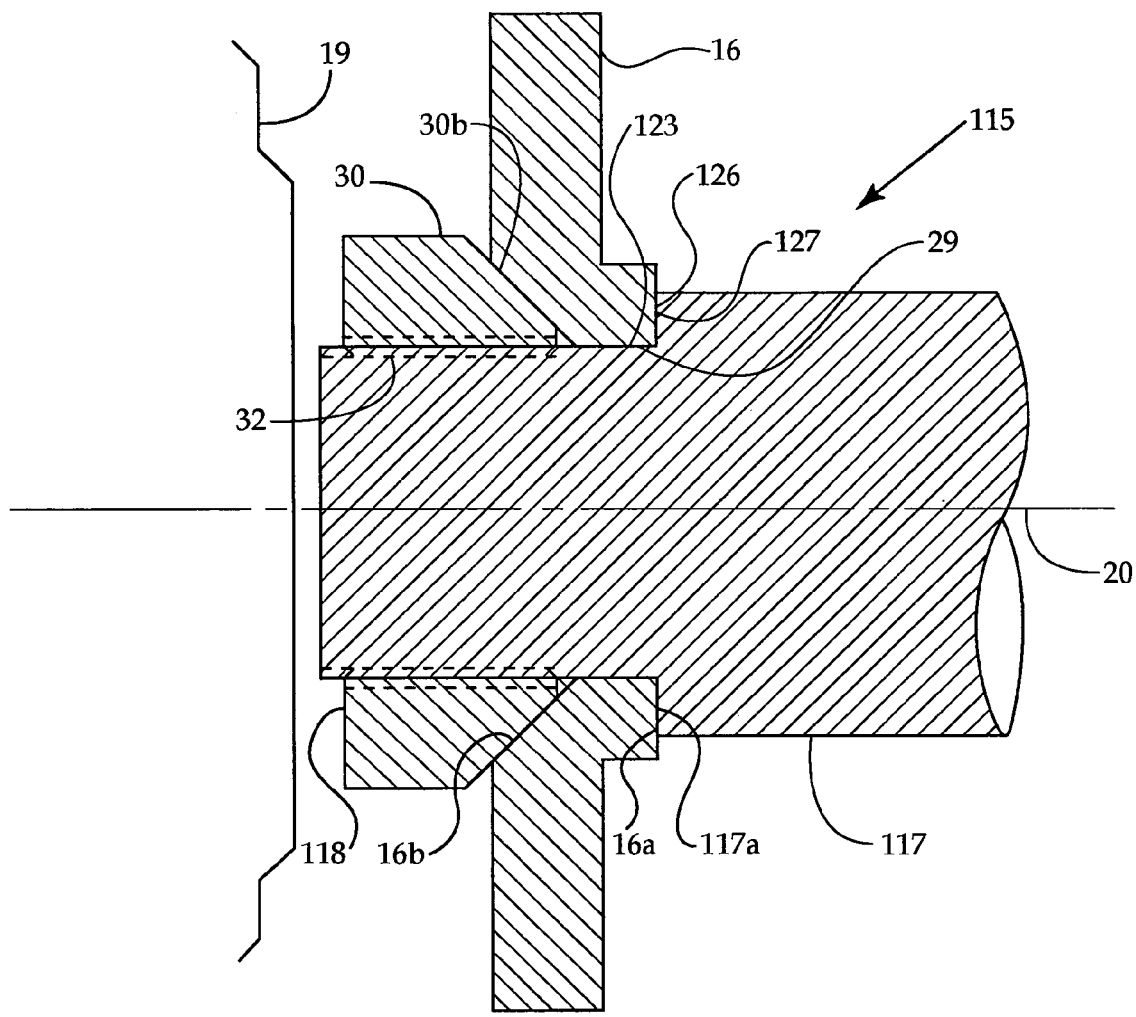
FIG. 3 is a sectioned side diagrammatic representation of a rotational coupling, according to an alternative embodiment of the present invention.

Referring to FIG. 3, there is shown a sectioned side diagrammatic representation of a rotational coupling 115, according to an alternative embodiment of the present invention. Similar to the embodiment illustrated in FIG. 2, the alternative embodiment includes a pump shaft 117 being coupled to the gear 16 via a threaded fastener 118. The threaded fastener 118 is tightened in the opposite direction than the gear 16 rotates. Further, the threaded fastener 118 is positioned along the axis 20 of the shaft 117 between the gear 16 and the fastener backstop 19.

However, according to the alternative embodiment illustrated in FIG. 3, the threaded fastener 118 preferably includes a nut 30. The threaded stud 123 extends through the stud bore 29 defined by the gear 16. The threaded stud 123 does not define a bore with internal threads, but rather includes external threads 32 to which the nut 30 is threaded. The predetermined break away torque above which the first and second bearing surfaces 16a and 117a more relative to one another is a function of the threaded attachment tightening torque applied to tighten the nut 30. Just as with the other embodiment, the tension created by the predetermined tightening torque exerts a force perpendicular to the torque transmission interface 126. The clamping force required to maintain the bearing surfaces 16a and 117a fixed relative to one another below the predetermined break away torque can be calculated in a conventional manner by knowing the coefficient(s) of friction between, and areas of, the bearing surfaces 16a and 117a. Those skilled in the art will appreciate that the coefficient of friction between the bearing surfaces 16a and 117a can be determined experimentally or from values known in the art. Although the alternative embodiment is not illustrated as including the bearing plate 28 between the bearing surfaces 16a and 117a, it should be appreciated that the bearing plate 28 could be positioned between the surfaces 16a and 117a. The nut 30 includes a frustoconical surface 30b that bears against the annular frustoconical surface 16b of the gear 16. However, it should be appreciated that a collar could be positioned between the nut 30 and the gear 16, as illustrated in FIG. 2.

INDUSTRIAL APPLICABILITY

Referring to FIGS. 1-3, the operation of the present invention will be described for the rotational coupling 15, 115 used to couple the drive component 12 to the pump 14 within the engine 10. It should be appreciated that the pump 14 could be any type of pump that is coupled to the engine 14, including but not limited to, a fuel transfer pump and a lubrication pump. Further, although the pump 14 is illustrated as coupled to the crank shaft 11 by the drive gear 13, the pump 14 can be coupled to the engine 10 by various means, including pulleys, chains, gears and the like. The rotational coupling 15, 115 of the present invention can also find use in machines other than engines. For instance, the rotational coupling can be used within a machine tool to break the coupling between the tool and the motor in the event the tool seizes within a machined part.

According specifically to the embodiment illustrated in FIG. 2, in order to assemble the over-torque break away rotational coupling 15, the coupler, preferably the gear 16, is coupled to the pump shaft 17. The bearing plate 28 is preferably slid onto the threaded stud 23 of the shaft 17 such that a surface of the bearing plate 28 makes contact with the second bearing surface 17a of the pump shaft 17. Engineers have found that machining the bearing plate 28 to include surfaces with the desired relatively smooth texture may be less expensive than machining the pump shaft 17 and the gear 16 to include the relatively smooth surfaces. The gear 16 is then slid onto the threaded stud 23 such that the first bearing surface 16a of the gear 16 makes contact with a surface of the bearing plate 28. The bolt 21 can then be received within the bore 22 of the threaded stud 23. The internal threads 31 of the threaded stud 23 are mated of the threads of the bolt 21. The collar 24 is preferably positioned between the bolt head 25 and the frustoconical surface 16b of the gear 16. Engineers have found that machining the collar 24 to include the inner and outer frustoconical surfaces 34 and 35 with the desired relatively rough texture may be less expensive than machine the frustoconical surfaces 16b and 25b of the gear 16 and the bolt head 25, respectively. The frustoconical surfaces aid in maintaining the concentricity of gear 16 and shaft 17.

Although the gear 16 could be slid directly on the bolt 21, the gear 16 preferably rotates on the smooth outer surface of the threaded stud 23. The gear 16 and the threaded stud 23 are concentric, meaning that they have the same center. Thus, the inner surface of the gear 16 defining the bore 29 and the outer surface of the threaded stud 23 may or may not remain in contact after assembly is completed. However, those skilled in the art will appreciate that any contact between the inner surface of the gear 16 and the outer surface of the threaded stud 23 does not transmit a torque to drive the rotation of the pump shaft 17.

In order to set the predetermined break away torque, the bolt 21 is tightened in the direction opposite of the driving direction of the gear 16 with the predetermined tightening torque. For instance, if the gear 16 rotates during normal operation of the rotational coupling 15 clockwise, the predetermined tightening torque will be applied counterclockwise to the bolt 21 by any method known in the art, such as by a technician applying the torque with a wrench. As the bolt 21 is being tightened, the force created by the predetermined tightening torque may slightly deform the shape of the collar 24 and form a tighter grip between the collar 24 and the bolt head 25. In order to determine when the tightening torque reaches the predetermined tightening torque, tools known in the art, such as a torque wrench, can be used. Once the predetermined tightening torque is applied to the bolt 21, the normal drive rotation of the gear 16 will be insufficient to loosen the bolt 21.

The predetermined break away torque preferably is a torque amount less than the possibly damaging torque at which the engine 10 can be damaged and greater than the maximum normal operation torque. The maximum normal operation torque is the maximum amount of torque exerted against the torque transmission interface 26 during normal operation of the rotational coupling 15. Both the damaging torque and the maximum normal operation torque can be determined by methods known in the art, and may vary between rotational couplings. Because the predetermined break away torque is less than the damaging torque, the gear 16 will break away from the pump shaft 17 within sufficient time to reduce the torque on the gear 16 and prevent damage to the engine 10. Because the predetermined break away torque is greater than the maximum normal operation torque, the first bearing surface 16a of the gear 16 and the second bearing surface 17*a* of the shaft 17 can remain relatively fixed in relation to one another, allowing torque to be transferred from the gear 16 to the pump shaft 17 during normal operation of the rotational coupling 15.

The predetermined torque at which the gear 16 breaks away from the pump shaft 17 is a function of the predetermined tightening torque applied to the bolt 21. It should be appreciated that tension created by the predetermined tightening torque results in load, or clamping force, being applied to the bearing plate 28. It should be appreciated that, if the bearing plate 28 is not physically attached to the pump shaft 17, the coefficient of friction between the bearing plate. 28 and the second bearing surface 17*a* may be greater than the coefficient of friction between the first bearing surface 16*a* and the bearing plate 28 in order to allow the first bearing surface 16*a* to slip while the second bearing surface 17*a* remains fixed relative to the bearing plate 28. Those skilled in the art will appreciate that the coefficients of friction between the surfaces 16*a* and 17*a* and the bearing plate 28 are a function of the materials comprising and the texture of the surfaces 16*a* and 17*a* and the bearing plate 28. The coefficient of friction between the first bearing surface 16*a* and the bearing plate 28 and the second bearing surface 17*a* and the bearing plate 28 are either known in the art and/or can be determined experimentally. Thus, from the coefficient of friction between the first bearing surface 16*a* and the bearing plate 28 and the predetermined break away torque, engineers can determine the clamping force, and hence the tightening torque, required to maintain the bearing surfaces 16*a* and 17*a* fixed relative to one another below the predetermined break away torque. The predetermined tightening torque required to create the clamping force can be determined by methods known in the art.

Once the bolt 21 is tightened with the predetermined tightening torque, the bolt 21 can be trapped between the fastener backstop 19 and the gear 16. The fastener backstop 19 is preferably separated from the bolt 21 by a distance small enough that the bolt 21 remains, at least partially, engaged with the threads 31 of the threaded stud 23 when making contact with the fastener backstop 19. Further, the reverse motion is limited such that the gear 16 remains meshed with gear 13. However, the distance separating the bolt 21 and the fastener backstop 19 is preferably large enough that the bolt 21 does not exert any substantial clamping force sufficient to transfer torque between the pump shaft 17 and the gear 16. Thus, the gear 16 is able to rotate with respect to the bearing plate 28.

Referring specifically to FIG. 3, in order to assemble the over-torque break away rotational coupling 115 according to the alternative embodiment, the gear 16 is coupled to the shaft 117. The gear 16 is slid onto the threaded stud 123 of the shaft 117 such that the first bearing surface 16*a* of the gear 16 is making contact with the second bearing surface 117*a* of the shaft 117. The internal threads of the nut 20 are threaded onto the external threads 32 of the threaded stud 23 extending through the bore 29 of the gear 16. Because the alternative embodiment is illustrated without the collar 24, the frustoconical surface 30*b* of the nut 30 bears against the frustoconical surface 16*b* of the gear 16. The frustoconical surfaces 30*b* and 16*b* of the nut 30 and of the gear 16*b* are preferably machined to be relatively rough in order to aid in the gripping between the gear 16 and the nut 30. By eliminating the need for components, such as the collar 24, the robustness of the rotational coupling 115 can be increased.

The nut 30 is then tightened in the direction opposite of the driving direction of the gear 16 with the predetermined tightening torque. The predetermined tightening torque is a function of the predetermined break away torque. The method of determining the predetermined break away torque and the predetermined tightening torque is the similar to the method discussed for the other embodiment illustrated in FIG. 2. However, rather than considering the coefficient of friction between the first bearing surface 16*a* and the bearing plate 28, the predetermined tightening torque will be determined based, in part, on the coefficient of friction between the first bearing surface 16*a* and the second bearing surface 117*a*. The pump shaft 117 and the gear 16 preferably are machined to include relatively smooth bearing surfaces 117*a* and 16*a* that allow sliding above the predetermined break away torque. By eliminating the need for additional components, such as the bearing plate, the robustness of the rotational coupling 115 may be increased.

Referring to FIGS. 1-2, the operation of the present invention will be described for one embodiment of the present invention. During normal operation of the rotational coupling 15, the engine 10 will rotate the crank shaft 11, and thus, the gear 13 coupled to the crank shaft 11. Gear 16 is meshed to rotate with gear 13. The clamping force being exerted onto the torque transmission interface 26 by the predetermined tightening torque of the bolt 18 is sufficient to maintain the first bearing surface 16*a* and the second bearing surface 17*a* fixed relative to one another during rotation. The torque of rotating gear 16 is transferred to pump shaft 17 via the bearing plate 28. The pump shaft 117 and the bolt 21 will rotate with the gear 16. The friction between the surfaces 16*a* and 17*a* and the bearing plate 28 allows the surfaces to rotate with one another. The frictional resistance of the surfaces to move relative to one another is not only proportional to the clamping force, but also proportional to the roughness of the surfaces. Thus, the clamping force needed to maintain the bearing surfaces 16*a* and 17*a* fixed relative to one another below the predetermined break away torque can be more accurately predicted by positioning the bearing plate 28 machined to include specific texture of its surfaces.

If the pump 14 seizes for any reason, such as a bearing failure, the seizure will cause the pump shaft 17 to resist rotation. The resistance to rotation by the pump shaft 17 can be transferred to the gear 16 via the bearing plate 28. Thus, the torque required to rotate the gear 16 will increase. When the torque acting on the torque transmission interface 26 reaches the predetermined break away torque, the clamping force created by the predetermined tightening torque of bolt 21 will be insufficient to maintain the first bearing surface 16*a* fixed relative to the bearing plate 28. However, because the second bearing surface 17*a* and the bearing plate 28 include a coefficient of friction greater than the first bearing surface 16*a* and the bearing plate 28, the bearing plate 28 will remain fixed relative to the second bearing surface 17*a*. Once the first bearing surface 16*a* slips, the rotation of the gear 16 on the pump shaft 17 will cause a force to act on the collar 24. Because the collar 24 is machined to slightly deform around the bolt head 25 and to include surfaces 34 and 35 that are relatively rough, the force acting on the collar 24 is sufficient to rotate the collar 24 and the bolt 21 with the gear 16 without slippage between the collar 24 and the gear 16 or bolt 21. As the gear 16 rotates, the bolt 21 will loosen, and the gear 16 will move out of contact with the bearing plate 28. The torque of the pump shaft 17 will not be transferred to the gear 16, reducing the likelihood of damage to the engine 10.

The bolt 21 will move axially backwards toward the fastener backstop 19. The axial reverse motion of the bolt 21 will be stopped when the bolt 21 makes contact with the fastener backstop 19. The fastener backstop 19 is preferably positioned at a distance from the bolt 21 and nut 30 such that the threads of the bolt 21 are still engaged with the internal threads 31 of the pump shaft 17. Thus, the fastener backstop 19 prevents the bolt 21, and possibly the gear 16, from falling from the rotational coupling 12. Further, the fastener backstop 19 is preferably positioned at a distance from the bolt 21 such that the movement of the gear 16 does not affect the meshing between gear 16 and gear 13. Because the de-coupling between the gear 16 and the shaft 17 will not affect the meshing of the gear 16 with adjacent gears, gear 16 can be an intermediate gear in a drive train extending from the crank shaft 11 to another coupled apparatus.

Referring to FIGS. 1 and 3, the operation of the rotational coupling 115 of the alternative embodiment of the present invention is similar to the operation of the rotational coupling 12 of the embodiment illustrated in FIG. 2. However, unlike the other embodiment, the torque of the rotating gear 16 is not transferred to the pump shaft 117 via a bearing plate, but rather through the friction between the first bearing surface 16a and the second bearing surface 117a. Further, when the pump seizes causing the torque acting on the torque transmission interface 126 to exceed the predetermined break away torque, the sliding of the first bearing surface 16a relative to the second bearing surface 17a will create a force that acts on the frustoconical surface 30b of the nut 30 rather than the collar 24. The friction between the frustoconical surface 30b of the nut 30 and the frustoconical surface 16b of the gear 16 allows the force to rotate the nut 30 with the gear 16 without slippage. The nut 30 rotates with the gear 16 and loosen until the nut 30 makes contact with the fastener backstop 19. It should be appreciated that the alternative embodiment could include the collar and bearing plate similar to the other embodiment.

The present invention is advantageous because it allows the breaking of a coupling between the pump 14 and the engine 10 in the event of pump seizure without the use of additional components. In the event of pump seizure, the rotational coupling 15, 115 of the present invention uses the pump shaft's resistance to rotation caused by the seizure to break the coupling between the pump shaft 17, 117 and the gear 16. The bolt 21 or the nut 30 is purposefully tightened in the direction opposite of the driving direction of the gear 16 with the predetermined tightening torque so that the gear 16 will slip, causing the nut or bolt 21 to loosen in the event of pump seizure. Because existing components can be used to break the coupling, the reliability and robustness of the rotational coupling 15, 115 can be increased. The rotational coupling 15, 115 of the present invention does not require additional components that could fail during normal operation of the rotational coupling. Further, because the present invention utilizes existing components, the cost of manufacturing the rotational coupling 15, 115 including the over-torque break away feature is relatively low.

Moreover, the present invention is advantageous because the coupling between the rotating gear 16 and the seized pump 14 can be broken without moving the gear 16 out of mesh with its driving gear 13. Thus, the gear 16 can be an intermediate or idler gear within the gear drive train between the crank shaft 11 and another gear driven apparatus. Because the gear 16 can continue rotation even after the coupling has been broken, the breaking will not affect the operation of the other gear driven apparatuses. Further, the fact that the gear 16 will stay in mesh with adjacent gears can reduce the possibility that the edges of gear 16 and adjacent gears, such as gear 13, will be damaged by misalignment with one another.

Those skilled in the art should appreciate that the over-torque break away rotational coupling and method of assembling the rotational coupling of the present invention is applicable to couple drive components in machines other than engines to apparatuses other than pumps. It should be further understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. An over-torque break away rotational coupling comprising:
    a coupler, which includes a gear, being operable to rotate in a first direction;
    a shaft including a threaded portion;
    a threaded fastener attaching the coupler to the shaft via the threaded portion of the shaft and including a tightening direction opposite to the first direction;
    a torque transmission interface including opposing surfaces of the coupler and the shaft; and the opposing surfaces remaining fixed relative to one another below a predetermined torque, and the opposing surfaces moving relative to one another above the predetermined torque;
    wherein the coupler includes at least one frustoconical surface; and
    the threaded fastener bears against the frustoconical surface.

2. The rotational coupling of claim 1 including a fastener backstop being positioned on an opposite side of the threaded fastener than the coupler along an axis of the shaft such that the threaded fastener is trapped between the coupler and the fastener backstop.

3. The rotational coupling of claim 1 wherein the predetermined torque is a function of an attachment tightening torque for the threaded fastener.

4. The rotational coupling of claim 1 wherein the opposing surfaces include a first bearing surface of the coupler and a second bearing surface on a shoulder of the shaft; and
    the first and second bearing surfaces being orientated perpendicular to an axis of the shaft.

5. The rotational coupling of claim 1 wherein the torque transmission interface includes a bearing plate positioned between the opposing surfaces.

6. The rotational coupling of claim 1 wherein the shaft includes a threaded stud being concentric with the coupler.

7. The rotational coupling of claim 1 wherein the threaded fastener includes one of a nut and a bolt; and
    the shaft includes one of matching external and internal threads, respectively.

8. The rotational coupling of claim 1 including a fastener backstop being positioned on an opposite side of the threaded fastener than the coupler along an axis of the shaft such that the threaded fastener is trapped between the coupler and the fastener backstop;
    the predetermined torque being a function of an attachment tightening torque for the threaded fastener;
    the threaded fastener including one of a nut and a bolt, and the shaft including one of matching external and internal threads, respectively;
    the coupler being concentric with the matching threads of the shaft;
    the opposing surfaces including a first bearing surface of the coupler and a second bearing surface on a shoulder of the shaft, and the first and second bearing surfaces being oriented perpendicular to the axis of the shaft; and the torque transmission interface including a bearing plate positioned between the first and second bearing surfaces.

9. An engine comprising:

a crank shaft operable to rotate about a first axis; and a pump coupled to the crank shaft via an over-torque break away rotational coupling that includes a coupler being operable to rotate in a first direction about a second axis spaced from and parallel to the first axis; a shaft including a threaded portion; a threaded fastener attaching the coupler to the shaft via the threaded portion of the shaft and including a tightening direction opposite to the first direction; and a torque transmission interface including opposing surfaces of the coupler and the shaft; and the opposing surfaces remaining fixed relative to one another below a predetermined torque, and the opposing surfaces moving relative to one another above the predetermined torque.

10. The engine of claim 9 wherein the coupler being a gear, which is one of a plurality of gears that couple the apparatus to the driving component.

11. The engine of claim 10 wherein the predetermined torque being a function of an attachment tightening torque for the threaded fastener; and the rotational coupling includes a fastener backstop being positioned on an opposite side of the threaded fastener than the coupler along an axis of the shaft.

12. The engine of claim 11 wherein the threaded fastener includes one of a nut and a bolt; and the shaft includes one of matching external and internal threads, respectively.

13. The engine of claim 12 wherein the opposing surfaces include a first bearing surface of the coupler and a second bearing surface on a shoulder of the shaft; and the first and second bearing surfaces being orientated perpendicular to the axis of the shaft.

14. The engine of claim 13 wherein the torque transmission interface including a bearing plate positioned between the first and second bearing surfaces.

15. The engine of claim 9 including a fastener backstop being positioned on an opposite side of the threaded fastener than the coupler along an axis of the shaft such that the threaded fastener is trapped between the coupler and the fastener backstop.

* * * * *